No Printed Specification Available
9286X
A. G. Hull,
Pessary.
Patented Dec. 15 1835.
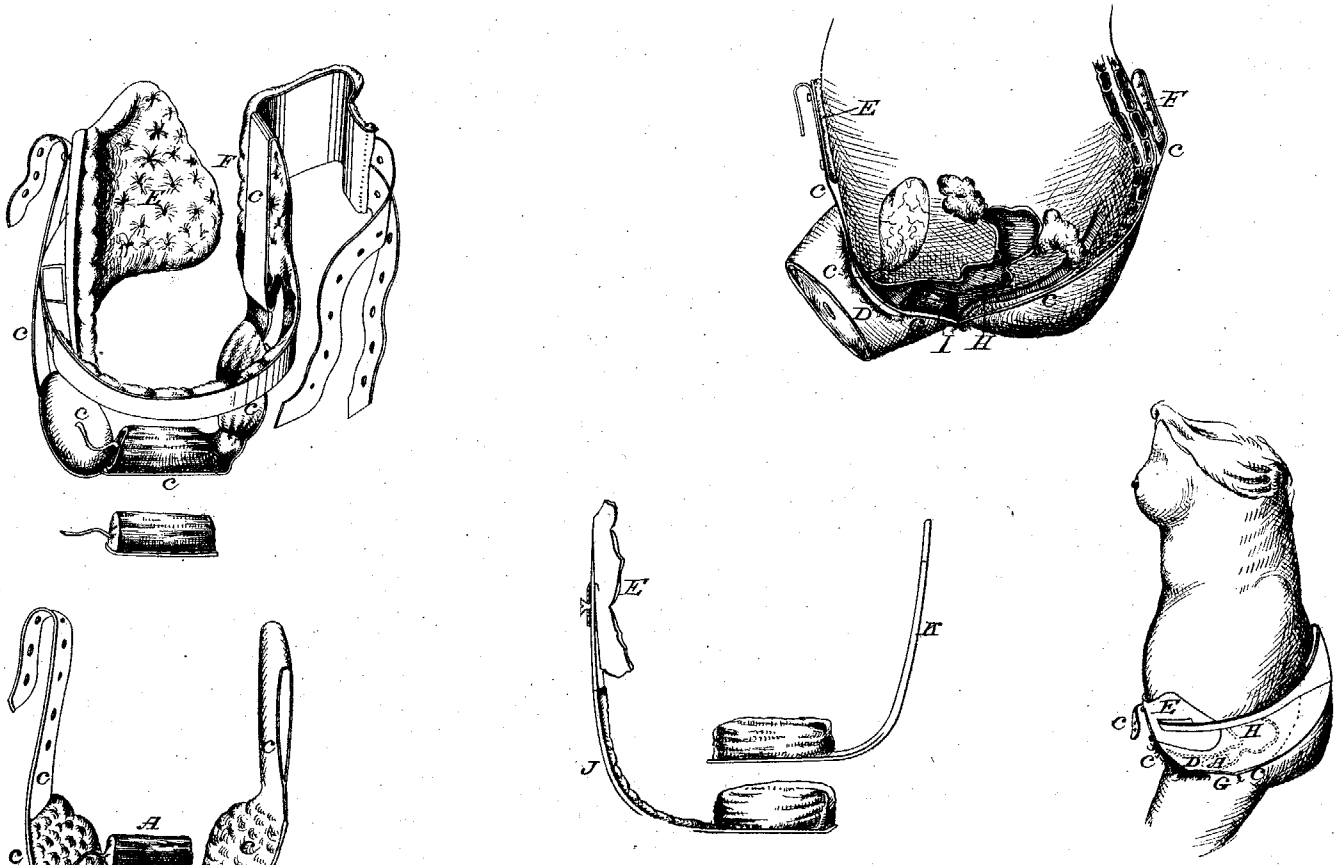
AM. PHOTO-LITHO. CO. N.Y. (OSBORNE'S PROCESS.)

Dec. 15. 1835 9286X 117.

John F. Gray administrator of Amos G. Hull, dec<sup></sup>d.

Letters Patent.

The Schedule, referred to in these Letters Patent, and making part of the same, containing a description in the words of the said John F. Gray himself, administrator of Amos G. Hull, deceased, of his Amos G. Hull's improvement in the Truss for the cure of relaxation of the Vagina, and prolapsus of the Uterus.

To all to whom these presents shall come. Be it known that Amos G. Hull, late deceased, of the City of New York, in the County of New York, and State of New York, did in his lifetime, invent a new and useful improvement on his Truss or instrument for the cure of Relaxation of the Vagina, & prolapsus, of the Uterus patented on the seventh day of May eighteen hundred & thirty four. The improvement consists in the adaptation of this Truss, in combination with a stopper or pessary of a peculiar form, & construction, to produce the necessary pressure on that lower part of the belly, between the thighs known in surgery by the name of Perineum; so as that the pessary shall be retained in the Vagina, in the position required, & with sufficient strength to resist that effort commonly considered as an inclination of the womb to descend; the retention to be effected by the assistance of the strap (in the old Truss above mentioned) which is sustained between the thighs, pendant from the abdominal & back pads; having by its material whether cloth or gum elastic, sufficient elasticity to give any desired pressure. It is known that an instrument called a pessary, has been long in use & variously constructed, but that mode which is now herein described, was invented and particularly adapted by the peculiarity of its construction, to the purpose for which it was designed, by forming it into a cylindrical shape A, of say from one & a half to about three inches long by from one half, to about one inch in diameter, though of course these dimensions will be suited to the patient. It is to be

[illegible]

to be composed of sponge, or gum elastic, or other pliable & elastic sub-
stance. If the sponge is adopted, then a case is to be made of mus-
lin or such like substance, to enclose it; and by being compressed
therein in a dry state will embrace the advantages to be obtained by
the expansion of it in the case, so as to give any degree of firmness
to be wished for. The ends of the case may be drawn together, so
as to produce there a flatness, having the edges somewhat rounded
which can be effected conveniently by means of hem & running or
string. Or, if gum elastic is used, then it may be moulded or cast
into the desired form, making a solid body throughout. This form
of pessary, when so constructed, is to have depending from the
end which will be nearest to the entrance of the vagina, a small
~~a [illegible]~~ cord or string B, for the purpose of withdrawing it when
necessary, and also for retaining it in its proper position, that
it may not be deranged; which is effected by connecting the string
at a slight tension with the strap C. of the Truss passing between
the thighs. Now, in the application of it, care must be taken, that
it is well lubricated & carefully introduced into the vagina D. ac-
cording to surgical rules. The string is now to be connected
to the elastic strap of the truss; which, passing between the thighs
is suspended from one pad E, to the other F. and this strap being
drawn tight as required, presses up the Perineum, and supplies artifici-
ally, the necessary contraction lost by undue relaxation of the muscles
& membrane of that part. It must be seen that this necessarily keeps the
pessary pressed up against the upper part of the vagina and retains
it there immovable against the pressure from above, or from the
direction of the womb H. and consequently effects the support of
that organ, in its proper position, as long as required. To medical men
the facility with which the pessary can be withdrawn as often as needed &
the slight risk of corrosion from Urinary deposites around it, as well
as the certainty of its not producing the injurious effects of the
sinking of the lower part of the vagina, beneath the weight of the
circular or ring pessary, as in the old practice; will present vast ad-
vantages advantages to be gained by the patients, in the ease & comfort attending this mode of application. Another manner adopted, was to apply a triangular shaped long wedge I, to the inside of the strap, so as to bear upon the perineum from without, or externally; and then dispense with the internal pessary. The effect of the pressure will be the same. Or, again, to employ a flat spring J, to descend from the front pad reaching the same part, to communicate the desired pressure with the same effect. Or else, to use a round spring K, to descend from the back pad to the parts, and still convey the same effect, the roundness intended to obviate inconvenience in sitting. All of these modes tend to produce the main effect contemplated by the aforesaid Amos G. Hull, viz. – that of affording such support by means of the strap, to the relaxed vagina as would produce through the agency of the pessary or the wedge a proper support to the pressure from the Uterus above, which will form the characteristic distinction of his principles of application by the modes above shown; as shall enable any competent professional persons to distinguish the said modes, as distinct from those of the practitioners. Now what I claim, as not heretofore used or known, & as the invention of my father in law, the said Amos G. Hull, deceased, and for which I now ask Letters Patent, is the manner of application of supports against the relaxation of the Vagina, & descent or prolapsus of the Uterus according to the modes or methods above set forth; viz. First, the mode of construction and shape or form used in the Pessary according to the principles for the use above set forth. Second – the application of the Pessary as described, combined with the support obtained from the elastic strap as already explained. Third – the moe of applying the wedge externally, by means of the strap, for the same effect as shown. Fourth – the manner of application, by means of the springs, either round or flat. as already stated.

In testimony that the above is a full description of the improvements made by the said Amos G. Hull, before his his decease, on his previously Patented Trust. Witnesses setting hand this thirty first day of October, in the year eighteen hundred and thirty five.

Test. Witnesses

Henry Stone
Robt. Clarke

John F. Gray, Administrator

Drawing

[1164 Words]